(12) United States Patent
Stubner et al.

(10) Patent No.: US 8,026,645 B2
(45) Date of Patent: Sep. 27, 2011

(54) ELECTRIC DRIVE

(75) Inventors: Armin Stubner, Buehl-Altschweier (DE); Martin Heyder, Ottersweier (DE); Matthias Koesters, Changsha/Xingsha (CN); Norbert Martin, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 12/523,574

(22) PCT Filed: Dec. 5, 2007

(86) PCT No.: PCT/EP2007/063359
§ 371 (c)(1), (2), (4) Date: Jul. 17, 2009

(87) PCT Pub. No.: WO2008/086917
PCT Pub. Date: Jul. 24, 2008

(65) Prior Publication Data
US 2010/0117470 A1 May 13, 2010

(30) Foreign Application Priority Data
Jan. 19, 2007 (DE) .......................... 10 2007 002 836

(51) Int. Cl.
*H02K 5/12* (2006.01)
(52) U.S. Cl. ........................................... 310/88; 310/83
(58) Field of Classification Search .................. 310/239, 310/88, 68 R, 83; 130/83
See application file for complete search history.

(56) References Cited

U.S. PATENT DOCUMENTS

| 5,194,769 | A | 3/1993 | Ade et al. | |
| 5,309,053 | A | 5/1994 | Ade | |
| 6,677,693 | B2 | 1/2004 | Ooyama | |
| 7,135,801 | B2 * | 11/2006 | Yagi | 310/239 |
| 7,511,393 | B2 | 3/2009 | Mizutani | |
| 2002/0105246 | A1 * | 8/2002 | Ooyama | 310/239 |
| 2005/0140224 | A1 | 6/2005 | Weigold et al. | |
| 2006/0244321 | A1 * | 11/2006 | Mizutani | 310/68 R |

FOREIGN PATENT DOCUMENTS

| DE | 3542632 A1 | 6/1986 |
| DE | 4101368 | 7/1992 |
| DE | 10010439 A1 | 9/2001 |

OTHER PUBLICATIONS

PCT/EP2007/063359 International Search Report.

* cited by examiner

*Primary Examiner* — Nguyen N Hanh
(74) *Attorney, Agent, or Firm* — Michael Best & Friedrich LLP

(57) ABSTRACT

The invention relates to an electric drive, particularly a windshield wiper drive for vehicles, comprising an electric motor (10) in a crucible-shaped, preferably metal, motor housing (14), a gearbox housing (16) that is attached to the motor housing (14), and an arrangement for the interference suppression of the motor (10). According to the invention, at least one choke coil (46, 48) for the interference suppression of the motor (10) is disposed in the transition region from the motor housing (14) to the gearbox housing (16), wherein in this transition region means (36, 56) are provided in order to shield the filtered coil end (47, 49) projecting into the gearbox housing (16) from the interfering radiation produced by the motor (10).

22 Claims, 2 Drawing Sheets

ELECTRIC DRIVE

BACKGROUND OF THE INVENTION

The invention is based on an electric drive, in particular a windshield wiper drive for vehicles.

DE 102 04 716 A1 already discloses an electric drive whose motor is arranged in a pot-like, metal housing which is combined with a gear mechanism housing. In this drive unit, an insulating base plate in the form of a mount for the motor brushes and further electrical components is situated in the transition region between the motor housing and the gear mechanism housing. Three choke coils for radio interference suppression of the motor are arranged on either side of the base plate, partly in the motor housing, partly in the gear mechanism housing without interference shielding.

Furthermore, DE 39 30 144 C2 discloses integrally forming a flange-like, metal mount for a bearing of the motor shaft on the gear mechanism housing of a windshield wiper drive in the transition region to the motor housing. An apparatus for interference suppression of the motor having two choke coils and three capacitors is arranged completely within the gear mechanism housing. In this case, feed lines to the interference suppression coils extend into the gear mechanism housing and there can emit interfering radiation which they receive in the production region of the interference, in particular through the commutator. In addition, the installation space required for the gear mechanism housing and therefore the overall dimensions of the drive are increased.

SUMMARY OF THE INVENTION

In contrast, the electric drive according to the invention has the advantage that the drive can be configured to be very compact overall since free space present in the preferably metal motor housing is used to partly accommodate the interference suppression apparatus. However, this particularly improves the interference suppression effect since the situation of feed lines from the motor space to the interference suppression means projecting into the shielded region of the gear mechanism housing and emitting interfering radiation there is avoided.

It is particularly advantageous when a bearing plate which is integrally formed on the gear mechanism housing is used at the same time as a shield against the interfering radiation emitted by the commutator of the motor since the bearing plate is configured such that it largely covers that end face of the motor housing which faces the gear mechanism housing while leaving free only one cutout to allow the motor shaft to pass through, and at least one further cutout to allow an electrical interference suppression element, such as a choke coil, to pass through, it being possible for these cutouts to be minimized in a targeted manner to match the required passage dimension in each case. It is expedient here when the choke coil is oriented axially parallel to the motor shaft and preferably is arranged with a relatively large portion of its overall length in the motor housing, whereas its filtered end, which faces away from the motor housing, projects into the gear mechanism housing and is protected by the metal bearing plate against interfering radiation emitted by the commutator of the motor. In this context, it is also advantageous when the gear mechanism housing is composed of metal, preferably of aluminum or an aluminum alloy.

The interference suppression apparatus of the electric drive preferably comprises two choke coils and three capacitors, with the two choke coils being arranged axially parallel to one another and to the motor axis and being joined with a capacitor, which is inserted between their connections which are averted from the motor, to form an interference suppression module which is arranged in the transition region between the motor housing and the gear mechanism housing in the manner discussed above.

Further refinements and details of the invention can be found in the subclaims and the embodiment of the invention which is discussed in greater detail below.

BRIEF DESCRIPTION OF THE DRAWINGS

An exemplary embodiment of the invention is illustrated in the drawings and explained in greater detail in the following description.

In the drawings

DETAILED DESCRIPTION

Figure 1:
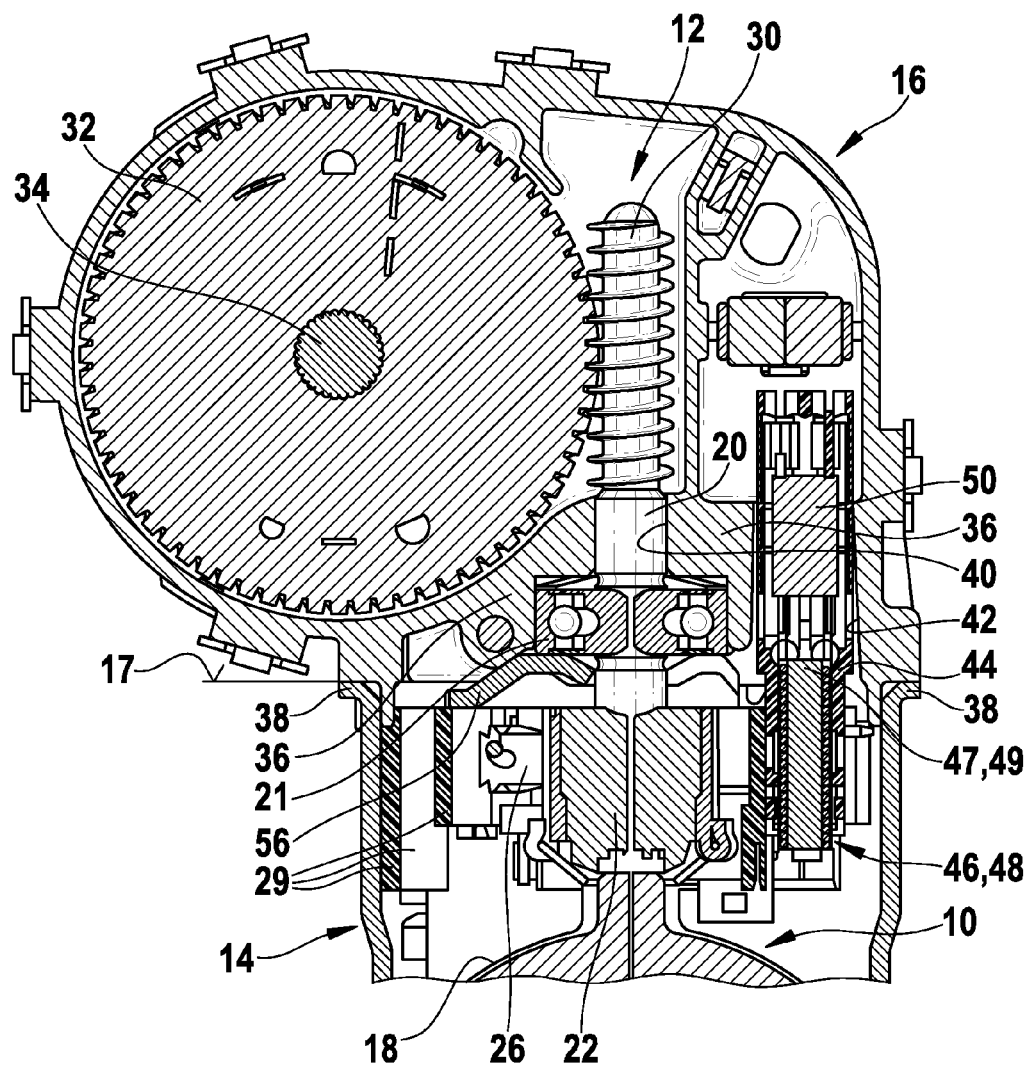
FIG. 1 shows a longitudinal section through a drive according to the invention, with the gear mechanism installation space and the adjoining portion of the motor installation space being illustrated.

FIG. 1 illustrates an electric windshield wiper drive for a motor vehicle having an electric motor 10 and a gear mechanism 12 for reducing the motor rotation speed to a lower drive rotation speed. The motor 10 is arranged in a motor housing 14; the gear mechanism is arranged in a gear mechanism housing 16. FIG. 1 illustrates only the end of a winding 18 and a drive shaft 20 and a commutator 22 of the motor 10, the brushes 24, 26 and 28 (of which only brush 26 can be seen in FIG. 1) brushing on said commutator. The open end face 17 of the motor housing 14 defines the transition from the motor housing 14 to the gear mechanism housing 16.

Figure 2:
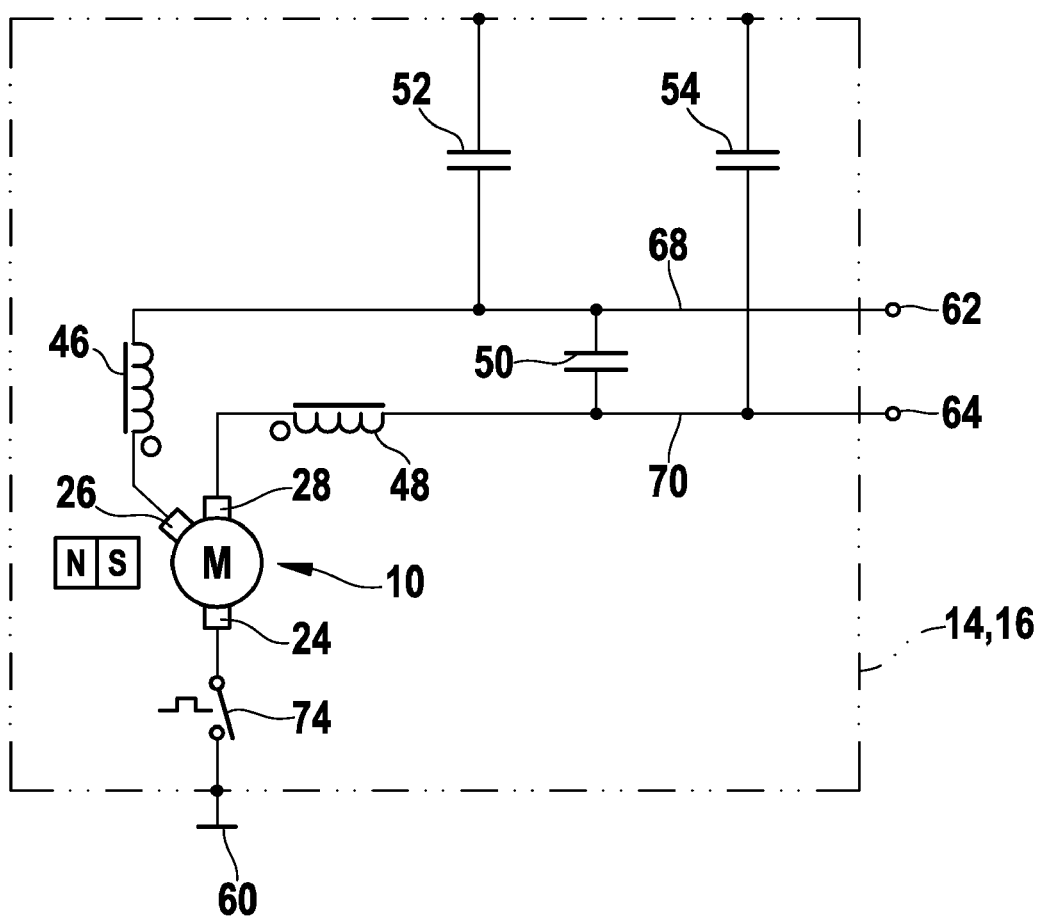
FIG. 2 shows a basic circuit diagram of the drive according to the invention together with the associated interference suppression components.

The gear mechanism 12 essentially comprises a drive worm 30 which rotates with the drive shaft 20 of the motor 10 and meshes with a worm gear 32 which, for its part, is fixedly connected to an output drive shaft 34. The gear mechanism housing is closed off parallel to the sectional plane by a cover (not illustrated). A bearing plate 36 for a motor bearing 21 is integrally formed on the gear mechanism housing 16 at the transition to the motor housing 14, said bearing plate being seated on a flange 38 of the motor housing and covering said motor housing, with the exception of a cutout 40 to allow the drive shaft 20 to pass through and a further cutout 42 through which two choke coils 46 and 48 which are held in a plastic mount 44 engage. The choke coils 46 and 48 are arranged congruently one behind the other, so that only one coil which lies in the sectional plane is visible in FIG. 1. A first capacitor 50 which bridges the two choke coils 46 and 48, as is illustrated in a circuit in FIG. 2, is also seated in the plastic mount 44. Two further capacitors 52 and 54 (which cannot be seen in FIG. 1) are likewise accommodated in the gear mechanism housing 16. The electrical connections between the choke coils 46, 48 and the capacitors 50, 52, 54 are realized in a conventional manner by plug connections; the motor-side connections of the choke coils 46 and 48 are connected to the brushes 26 and 28 by means of wires (not illustrated).

The motor housing 14 is composed of steel; the considerably stronger gear mechanism housing 16 is a cast part, preferably comprising aluminum, including the integrally formed bearing plate 36. In this case, the motor housing 14 is formed in a pot-like manner so that the bearing plate 36 is given a substantially circular configuration which curves upward in the region of the motor bearing 21. The choke coils 46 and 48, together with the plastic mount 44, penetrate the bearing plate 36 to the side of the commutator 22 in the transition region from the motor housing 14 to the gear mechanism housing 16, with the gear mechanism-side, filtered coil end 47 or 49 projecting into the gear mechanism housing 16 and therefore being shielded by the metal bearing plate 36 largely against the interfering radiation which is generated by the motor 10 and is produced, in particular, by spark formation at the commutator 22.

The two choke coils 46 and 48 are oriented axially parallel to one another and to the motor axis and project with a relatively large portion of their overall length into the motor housing 14, so that this portion of the motor space to the side of the brush mount 29 can be used to reduce the overall size of the drive.

In this case, the interference suppression effect of the arrangement is further improved by a substantially plate-like bearing holder 56 for the motor bearing 21, which bearing holder is fixed to the bearing plate 36 in the transition region from the motor housing 14 to the gear mechanism housing 16 in order to support the motor bearing. This likewise metal, preferably steel, bearing holder 56 covers at least the commutator 22 and as a result increases the shielding effect for the coil ends 47 and 49.

FIG. 2 shows the basic circuit diagram of an electric motor 10 with permanent-magnet excitation which is fed from a DC voltage supply system. Two different rotation speeds for the motor 10 are obtained by selectively connecting connections 62 and 64 to the positive pole of the DC voltage supply system, of which the ground pole is denoted 60. The connections 62 and 64 are connected, by means of the choke coils 46 and 48, to the brush 26 for fast running and to the brush 28 for slow running. The motor is connected to ground by means of the brush 24 and a safety switch 74 which protects the motor 10 against overloading and/or against an excessive temperature.

The interference suppression apparatus is completed by the capacitors 50, 52 and 54, with the first capacitor 50 being situated between the two supply system-side connections of the choke coils 46 and 48, while the capacitor 52 connects the supply system-side end of the choke coil 46 to ground 60 and the capacitor 54 connects the supply system-side end of the coil 48 to ground 60.

Operation and circuitry of an electric motor 10 for driving windshield wipers are known in many forms and do not need to be discussed any further here.

The invention claimed is:

1. An electric drive having an electric motor (10) in a pot-like motor housing (14), having a gear mechanism housing (16) which is attached to the motor housing (14), and having an arrangement for radio interference suppression of the motor (10), characterized in that at least one choke coil (46, 48) for radio interference suppression is arranged in a transition region from the motor housing (14) to the gear mechanism housing (16), the transition region having portions in both the motor housing (14) and the gear mechanism housing (16) such that a first portion of the at least one choke (46, 48) is in the motor housing (14) and a second portion of the at least one choke (46, 48) is in the gear mechanism housing (16), and in that means (36, 56) are provided in the transition region in order to shield a filtered coil end (47, 49) which projects into the gear mechanism housing (16) from the interfering radiation generated by the motor (10).

2. The electric drive as claimed in claim 1, characterized in that the gear mechanism housing (16) is composed of metal.

3. The electric drive as claimed in claim 2, characterized in that the gear mechanism housing (16) is composed of aluminum or an aluminum alloy.

4. The electric drive as claimed in claim 2, characterized in that a bearing plate (36) is integrally formed on the gear mechanism housing (16) and covers an end face (17) of the motor housing (14) which faces the gear mechanism housing (16) while leaving free a cutout (40) to allow a drive shaft (20) of the motor (10) to pass through and at least one further cutout (42) to allow at least one choke coil (46, 48) to pass through.

5. The electric drive as claimed in claim 4, characterized in that the at least one choke coil (46, 48) is arranged axially parallel to the drive shaft (20) of the motor (10).

6. The electric drive as claimed in claim 5, characterized in that the at least one choke coil (46, 48) is arranged with a relatively large portion of its overall length in the motor housing (14) and projects into the gear mechanism housing (16) only by way of its filtered end (47, 49).

7. The electric drive as claimed in claim 6, characterized in that two choke coils (46, 48) are arranged axially parallel to one another and to a motor axis (20) and are joined with at least one capacitor (50, 52, 54) to form an interference suppression module.

8. The electric drive as claimed in claim 7, characterized in that two choke coils (46, 48) and one capacitor (50) are combined in a plastic mount (44), which is fixed in the gear mechanism housing (16), to form an interference suppression module.

9. The electric drive as claimed in claim 8, characterized in that a substantially plate-like metal bearing holder (50) which covers a commutator (22) is arranged on a motor side of the bearing plate (36) of the gear mechanism housing (16) as an additional shield for the commutator region.

10. The electric drive as claimed in claim 1, characterized in that a bearing plate (36) is integrally formed on the gear mechanism housing (16) and covers an end face (17) of the motor housing (14) which faces the gear mechanism housing (16) while leaving free a cutout (40) to allow a drive shaft (20) of the motor (10) to pass through and at least one further cutout (42) to allow at least one choke coil (46, 48) to pass through.

11. The electric drive as claimed in claim 1, characterized in that the at least one choke coil (46, 48) is arranged axially parallel to the drive shaft (20) of the motor (10).

12. The electric drive as claimed in claim 1, characterized in that the at least one choke coil (46, 48) is arranged with a relatively large portion of its overall length in the motor housing (14) and projects into the gear mechanism housing (16) only by way of its filtered end (47, 49).

13. The electric drive as claimed in claim 1, characterized in that two choke coils (46, 48) are arranged axially parallel to one another and to a motor axis (20) and are joined with at least one capacitor (50, 52, 54) to form an interference suppression module.

14. The electric drive as claimed in claim 1, characterized in that two choke coils (46, 48) and one capacitor (50) are combined in a plastic mount (44), which is fixed in the gear mechanism housing (16), to form an interference suppression module.

15. The electric drive as claimed in claim 1, characterized in that a substantially plate-like metal bearing holder (50) which covers a commutator (22) is arranged on a motor side of the bearing plate (36) of the gear mechanism housing (16) as an additional shield for the commutator region.

16. The electric drive as claimed in claim 1, characterized in that the motor housing (14) is composed of metal.

17. An electric drive having an electric motor (10) in a pot-like motor housing (14), having a gear mechanism housing (16) which is attached to the motor housing (14), and having an arrangement for radio interference suppression of the motor (10), characterized in that at least one choke coil (46, 48) for radio interference suppression is arranged in a transition region from the motor housing (14) to th gear mechanism housing (16);

means (36, 56) are provided in the transition region in order to shield a filtered coil end (47, 49) which projects into the gear mechanism housing (16) from the interfering radiation generated by the motor (10); and a bearing plate (36) is integrally formed on the gear mechanism housing (16) and covers an end face (17) of the motor housing (14) which faces the gear mechanism housing (16) while leaving free a cutout (40) to allow a drive shaft (20) of the motor (10) to pass through and at least one further cutout (42) to allow at least one choke coil (46, 48) to pass through.

18. The electric drive as claimed in claim 17, characterized in that the at least one choke coil (46, 48) is arranged axially parallel to the drive shaft (20) of the motor (10).

19. The electric drive as claimed in 17, characterized in that the at least one choke coil (46, 48) is arranged with a relatively large portion of its overall length in the motor housing (14) and projects into the gear mechanism housing (16) only by way of its filtered end (47, 49).

20. The electric drive as claimed in claim 17, characterized in that two choke coils (46, 48) are arranged axially parallel to one another and to a motor axis (20) and are joined with at least one capacitor (50, 52, 54) to form an interference suppression module.

21. The electric drive as claimed in claim 17, characterized in that two choke coils (46, 48) and one capacitor (50) are combined in a plastic mount (44), which is fixed in the gear mechanism housing (16), to form an interference suppression module.

22. An electric drive having an electric motor (10) in a pot-like motor housing (14), having a gear mechanism housing (16) which is attached to the motor housing (14), and having an arrangement for radio interference suppression of the motor (10), characterized in that at least one choke coil (46, 48) for radio interference suppression is arranged in a transition region from the motor housing (14) to the gear mechanism housing (16), means (36, 56) are provided in the transition region in order to shield a filtered coil end (47, 49) which projects into the gear mechanism housing (16) from the interfering radiation generated by the motor (10), and a substantially plate-like metal bearing holder (50) which covers a commutator (22) is arranged on a motor side of the bearing plate (36) of the gear mechanism housing (16) as an additional shield for the commutator region.

\* \* \* \* \*